United States Patent Office 2,988,265
Patented June 13, 1961

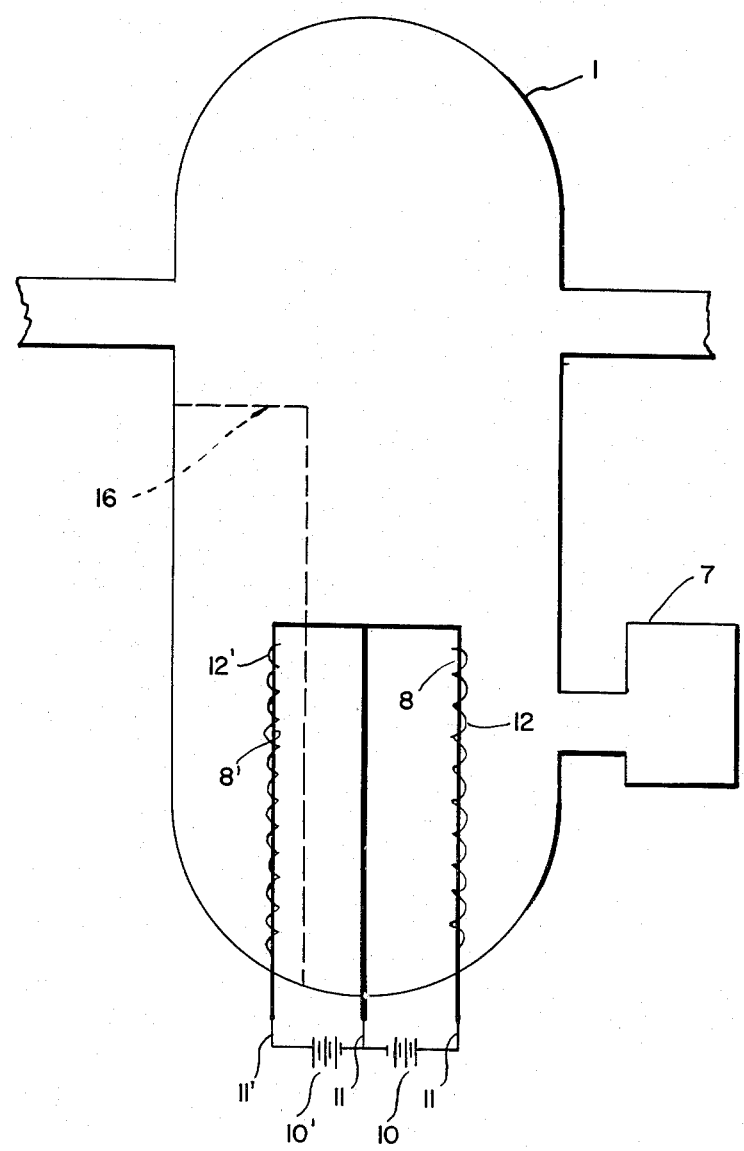

2,988,265
VACUUM DEVICE
Gunter Reich, Koln-Zollstock, Germany, assignor to National Research Corporation, Cambridge, Mass., a corporation of Massachusetts
Filed Mar. 21, 1958, Ser. No. 722,866
5 Claims. (Cl. 230—69)

It is known that gases are absorbed at very low pressures while at the same time with an electric discharge or in combination with an ion source, metals or nonmetals are vaporized or adsorptive clean metallic surfaces are produced (getter effect). It is further known that the ability to absorb gases is different not only from metal to metal but also with the same metal from gas to gas. Thorough investigations have shown, that at pressures below $10^{-5}$ mm. Hg the absorbing gases can react with each other or with the substances dissolved or bound in the getter metal. There then exist gaseous compounds which were not present originally in the receptacle and which are bound only very slowly or not at all on further gettering. Thus $CH_4$ and $C_2H_6$ exist in a surprising way as reaction products in the absorption of $H_2O$ and $CO$ on titanium. Further, the reaction of $H_2O$ and $N_2$ to $NH_3$ has been observed. The final pressure attained with the ion getter pump is limited by these reactions which can be followed so that only towards the end is $CH_4$ observed with the mass spectrometer.

There is thus presented the problem of collecting either the reactive components of the gas mixture or the reaction product itself by another means. Both can happen if in the receptacle, besides the preferably vaporized metal or non-metal, a second substance is present in absorbable form. Thereby the second substance can be deposited on the walls by evaporation to attain particularly cleaner surfaces or be freed of impurities by vaporization.

Thus, for example, besides titanium there is vaporized a second getter metal which binds a reactant more strongly, for example, zirconium for $H_2$ or tantalum for C. Further, arrangements can be used in which, for example, the fragments of the reaction products produced at the hot places of the ion sources, for example, CH, $CH_2$ and $CH_3$ are absorbed with carbon or NH and $NH_2$, with ammonia, as is the case with copper surfaces.

Reference should be had to the drawing which is a schematic fragmentary view of one preferred embodiment of the invention as applied to an ion gettering pump of the type illustrated in U.S. Patent 2,796,555, dated June 18, 1957. The pump includes a housing 1 containing filaments 8 and 8' connected, by suitable leads 11 and 11', to two separate power supplies 10 and 10'. On filament 8, there is positioned a first vaporizable getter element 12 such as titanium. On filament 8', there is positioned the second vaporizable getter element 12' such as zirconium. An ionization means is illustrated at 7.

Finally, the atomic or molecular gases occurring at the same time with the breakdown products can be removed so that they are diffused through heated, gas-permeable metal walls and here separately absorbed. Such a metal wall is illustrated schematically at 16 in dotted lines in the drawing. This metal wall is made, for example, for the case that hydrogren should have to be removed, preferably of palladium; in case oxygen is to be removed, of silver. The absorption in the auxiliary chamber occurs in a known manner, either by a pure ion getter system, perhaps according to the construction principle of the Penning vacuum gage, or by an ion getter pump or by other suitable means, for example, a mercury vapor diffusion pump with cooling trap. By this means it is possible to remove such residual gas which previously stubbornly remained in the receptacle.

What is claimed is:
1. The process for producing a high vacuum wherein a gas to be pumped is ionized, comprising the steps of vaporizing a first gettering metal in a receptacle constituting an ion gettering pump, ionizing gases in the receptacle and sorbing some of said ionized gases in a condensed layer of said first getter metal, and thereafter vaporizing and condensing a different gettering metal in said receptacle to trap byproducts of the gettering reaction which are not sorbed by the first gettering metal.
2. The process according to claim 1 wherein the first gettering metal comprises titanium and the second gettering metal comprises zirconium.
3. A process according to claim 1 wherein the second gettering metal is vaporized in a chamber separated from that portion of the ion pump containing the first gettering metal by means of a gas-permeable wall.
4. The process according to claim 1 wherein the second gettering metal is one which preferably sorbs hydrogen.
5. The process according to claim 1 wherein the second gettering metal is one which preferably sorbs hydrocarbons.

References Cited in the file of this patent
UNITED STATES PATENTS

| | | |
|---|---|---|
| 2,636,664 | Hertzler | Apr. 28, 1953 |
| 2,796,555 | Connor | June 18, 1957 |

FOREIGN PATENTS

| | | |
|---|---|---|
| 768,003 | Great Britain | Feb. 13, 1957 |